M. W. BROWN.
Slate-Frame.
No. 227,674.                               Patented May 18, 1880.
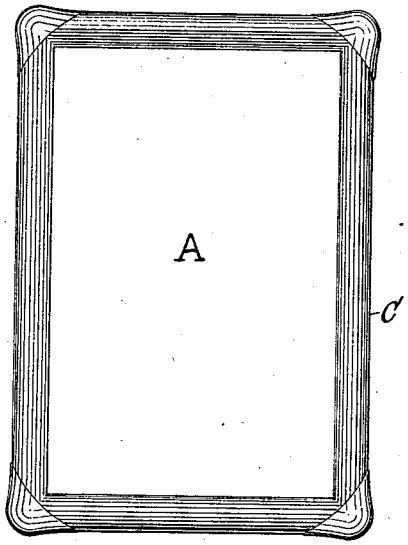 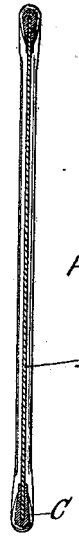
FIG. 1.                    FIG. 2.
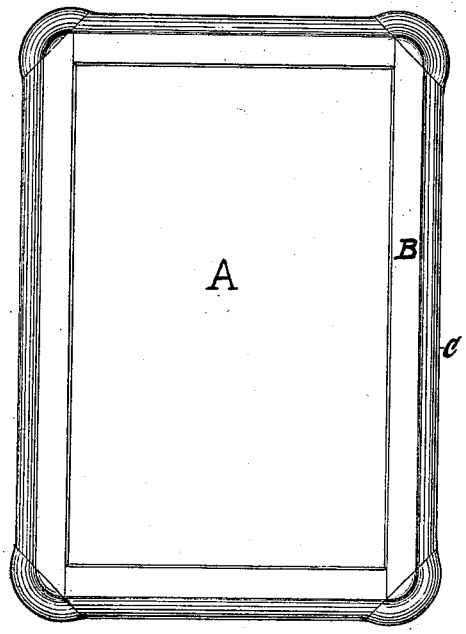 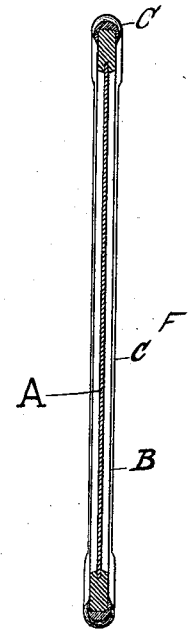
FIG. 3.                    FIG. 4.
WITNESSES                                INVENTOR.

UNITED STATES PATENT OFFICE.

MORGAN W. BROWN, OF BROOKLYN, ASSIGNOR TO FRANCIS EMACK, OF HEMPSTEAD, NEW YORK.

SLATE-FRAME.

SPECIFICATION forming part of Letters Patent No. 227,674, dated May 18, 1880.

Application filed January 20, 1880.

*To all whom it may concern:*

Be it known that I, MORGAN W. BROWN, of Brooklyn, Kings county, New York, have invented a new and useful Process of Forming Frames Directly upon the Edges of Slates; and I do hereby declare the following to be a full and correct description of the same, reference being had to the accompanying drawings, in which—

Figure 1 is a view of a slate to which an elastic or flexible composition frame has been directly applied; Fig. 2, a sectional view of the same. Fig. 3 is a view of a slate inclosed in a frame to which a covering of an elastic or flexible composition has been applied; Fig. 4, a sectional view of the same.

The same letter indicates the same part in all the figures.

The nature of my invention consists in the process hereinafter described of applying a suitable composition while in a plastic or molten state directly to the edges or frames of slates to form a continuous and homogeneous frame or covering for the same, having the desiderated properties of elasticity, flexibility, and hardness, resulting from the ingredients of which the composition is formed, all as hereinafter more specifically set forth.

In the drawings, A marks the slate or tablet; B, the wooden frame in which the same is usually inclosed, and C the elastic or flexible compound applied to the slate proper or to the frame of the same by my process.

The composition which I prefer to employ is that described in Letters Patent No. 89,198, granted to me April 20, 1869, to which reference may be made; but any composition having similar properties would answer the same purpose.

The composition described in said patent consists of an admixture of a solution of gum tragacanth in glycerine with a solution of gelatine in water and glycerine, and is prepared and applied to use in the manner fully set forth in detail in said patent.

I place the composition in any suitable shallow vessel, (metal being preferred,) and, having reduced it to a fluid or molten state, I dip the margin of the slate into the composition to a depth equal to the desired width of the frame. The slate is then removed until the composition solidifies, when the dipping is repeated as often as may be required to secure the proper thickness of material to form the frame. When the frame is thus completed I coat it with any suitable water-proof varnish.

I am aware that slates provided with wooden frames have heretofore been covered at the corners or throughout their entire extent with rubber to render them noiseless and less liable to fracture from the accidents to which they are exposed. Rubber has also been applied directly to the edges of a slate by perforating said edges and vulcanizing the rubber onto the slate. In neither case is the process which I employ applicable, as rubber applied in such a way would not adhere either to slate or wood.

I prefer to dispense with the wooden frames, although my process is applicable to slates already provided with them, and may be used if desired. I also dispense in my process with perforations in the edges of the slate, as these are rendered unnecessary by the fact that I use a composition which tenaciously adheres to the slate without any such additional means of union.

What I claim, and desire to secure by Letters Patent, is—

The process herein described of forming a composition frame or covering directly upon the frames or edges of school-slates, the same consisting in placing the desired composition, substantially such as hereinbefore referred to, in a shallow vessel, reducing it by heat to the proper consistency, and dipping the edges of the slate into it as often as may be necessary to give the required thickness to the covering or frame, which may afterward be finished in any desired manner, all substantially as specified.

MORGAN W. BROWN.

In presence of—
  A. SIDNEY DOANE,
  P. W. OSTRANDER.